United States Patent [19]

Trenkler

[11] 4,121,478
[45] Oct. 24, 1978

[54] RETRACTABLE HEADLIGHT FOR MOTOR VEHICLES

[75] Inventor: Werner Trenkler, Asperg, Germany
[73] Assignee: Porsche AG, Germany
[21] Appl. No.: 712,799
[22] Filed: Aug. 9, 1976

[30] Foreign Application Priority Data

Aug. 9, 1975 [DE] Fed. Rep. of Germany ....... 2535677

[51] Int. Cl.² .............................................. G05G 5/06
[52] U.S. Cl. ......................................... 74/529; 74/66; 74/527
[58] Field of Search .................... 74/527, 528, 529, 66

[56] References Cited

U.S. PATENT DOCUMENTS

| | | | |
|---|---|---|---|
| 808,253 | 12/1905 | Patten | 74/66 |
| 1,276,114 | 8/1918 | Reynolds | 74/527 |
| 1,278,974 | 9/1918 | Meyer | 74/527 |
| 1,533,310 | 4/1925 | Farmer | 74/527 |

OTHER PUBLICATIONS

Chrysler – Body Service Manual – 1971 – pp. 39–44.

*Primary Examiner*—Benjamin W. Wyche
*Assistant Examiner*—Wesley S. Ratliff, Jr.
*Attorney, Agent, or Firm*—Craig & Antonelli

[57] ABSTRACT

A retractable headlight arrangement for motor vehicle includes a driving device for driving the headlight between its retractive position and its upright, in-use position. Driving device includes a rotatably driven crank which is mechanically coupled to a shaft for rotating the headlight, and includes a locking engagement mechanism for operating a locking mechanism for the headlight during a dead-position portion of rotation of the rotatably driven crank.

11 Claims, 2 Drawing Figures

RETRACTABLE HEADLIGHT FOR MOTOR VEHICLES

FIELD OF THE INVENTION

The present invention relates to a retractable headlight for a motor vehicle which is pivotable about a shaft and cooperates with a drive mechanism which pivots the headlight about the shaft. A locking device is associated with the headlight to fix the headlight in its in-use position.

BACKGROUND OF THE INVENTION

German laid open publication 1946010 discloses a retractable headlight in which a rotatable shaft, for pivoting the headlight, is held in position by means of an electromagnetically controlled holding means. This type of device has proved unreliable and quite expensive because of the use of additional electrical apparatus.

SUMMARY OF THE INVENTION

It is an object of the present invention to provide a holding arrangement for a retractable headlight, particularly one which is arranged at the end position of the headlight, which is both reliable and simply constructed.

In accordance with the present invention, a new and improved locking device, which normally locks the headlight in its in-use or upright position, becomes disengaged by a mechanical transfer arrangement employing a crank-type gear. This crank-type gear rotates about a motor driven shaft and has a prescribed dead-position range during which there is no pivotal movement of the headlight. Within this range, the locking device is activated to release the locking mechanism and permit the headlight to be subsequently retracted into a rest position during further movement of the crank gear. The transfer mechanism employs a linkage having two double-armed levers, one of which operatively cooperates with the crank gear and the other of which cooperates with the locking mechanism. The first lever is arranged on the shaft about which the headlight pivots. This lever acts together with a rotation member of the crank gear and works together with a carrier pin contained on the crank gear. The first lever also cooperates with an arm which is coupled to the second lever of the locking mechanism so that the first and second levers pivot in synchronism. The second lever is associated with a biasing spring to normally urge both levers in a prescribed rotational direction.

By virtue of this arrangement, the locking device is simple in construction and, through its cooperation with the crank gear, is forceably controlled at all times and is, therefore, operatively reliable. The movement of the crank gear in its dead-position range results in substantially no pivotal movement of the headlight so that, during this rotational period or path, the remainder of the system cooperates with the locking mechanism to operate the same. By arranging the first lever on the rotational shaft of the headlight, additional bearing members become unnecessary. Moreover, by providing a lock-type handle as a closure member, further operating members for the locking mechanism become unnecessary during the period of time that the headlight is displaced from its non-use position to its in-use position in the vehicle.

DETAILED DESCRIPTION

Figure 1:
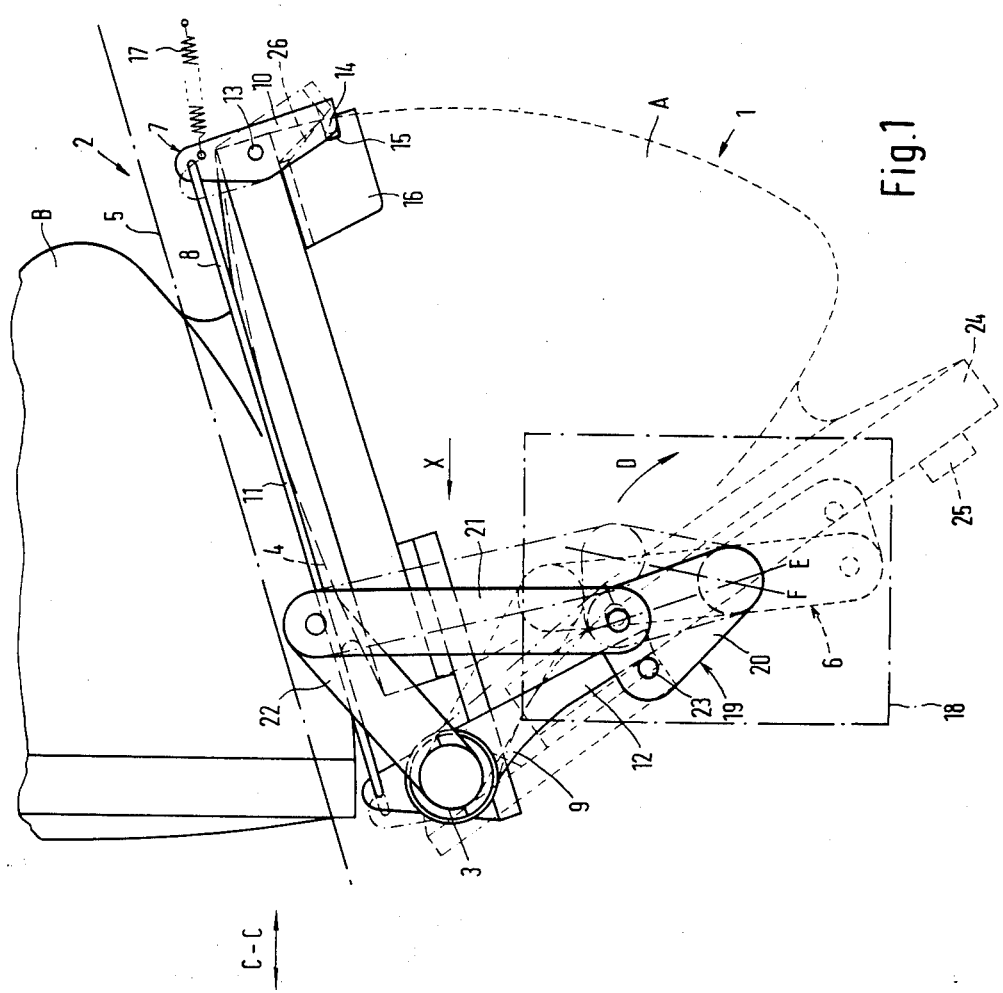
FIG. 1 illustrates a partial view of a rotatable headlight positioned in the forward compartment of a motor vehicle.

FIG. 1 illustrates the mechanism of the present invention for rotating a retractable headlight between in-use (upright) position B and an out of-use (lower inclined) position A of a headlight 1 beneath the surface 5 of the body 2 of an automobile. The bold lines in FIG. 1 show the position of the mechanism for the upright (in-use) position of the headlight while the dotted lines show the position of the various componenets of the mechanism for the out of-use (rest) position A of the headlight.

The headlight 1 itself includes a base generally designated at 4, the forward end of which is fixedly mounted on a shaft 3 which extends cross-wise to the longitudinal direction C—C of the vehicle. The dash/dot line 5 generally designates the contour of the upper surface of the vehicle body 2. Also fixedly mounted upon the shaft 3 is an operating lever 22. Slidely mounted on the shaft 3, for rotational movement with respect to the shaft, proper, is a first lever 9, one end of which is coupled with a linkage member 11, while the other end 12 of the lever 9 is rectilinearly shaped and, in the position shown by the bold lines in FIG. 1, rests against a pin 23 provided in a crank 20. The crank 20 of a rotation member generally designated by reference numeral 19 is affixed to the shaft of a drive motor 18, at the lower vertix of the crank 20, proper, and rotates about the shaft in the direction of the arrow D when the motor is engaged. Adjacent the pin 23 is a pin for rotatably coupling an operating lever 21 with respect to the crank gear 20. The other end of the operating lever 21 is coupled by way of a further pin to one end of the operating lever 22. These operating members and the crank gear of the rotating device form a driving device for pivotably rotating the headlight between its in-use and rest positions B and A, respectively, about the axis of shaft 3. When the headlight is in its rest position, the lower housing portion 24 thereof rests against a stop 25 provided in the body of the vehicle.

The locking mechanism is generally designated by reference numeral 7 and includes a lever 10 rotatably coupled about a pin 13 and engaging a lug 14 into a recess 15 of a lock member 16. The lock member 16 is fastened to the headlight 1. The lever 10 is also mechanically coupled at the end 8 of the linkage 11 and is further connected to a spring 17 which is connected to the body of the vehicle to provide a bias upon lever 10 and, consequently, a similar bias upon lever 9 coupled to the lever 10 by way of linkage 11.

Figure 2:
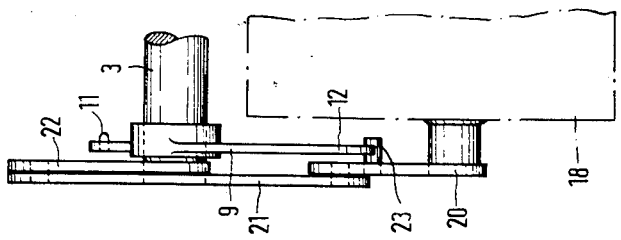
FIG. 2 is an end view of a portion of the arrangement shown in FIG. 1 taken in the direction of the arrow X in FIG. 1.

The operation of the mechanism illustrated in FIGS. 1 and 2 and described above will now be explained.

Initially, let it be assumed that the headlight is in its in-use position B shown by the bold lines in FIG. 1. In this position, the lever 10 of the locking mechanism is urged against lug 14 into the recess 15 of the lock member 16 in view of the bias provided by spring 17. The rectilinear end 12 of the first lever 9 rests against the pin 23 of the crank gear member 20. Now, in order to retract the headlight, the electric motor 18 is energized to cause clockwise rotation, as shown in the figure, in the direction of arrow D of the member 20. As was mentioned previously, there is a substantially dead-position range for rotation of member 20 during which operating lever 21 causes substantially no movement of the headlight proper. This dead range is identified by the angle between lines E and F shown in FIG. 1.

During the rotation of the member 20 about the output shaft of the electric motor 18, however, pin 23 causes the first lever 9 to rotate about shaft 3 in a counter-clockwise direction as viewed in FIG. 1. This counter-clockwise rotation of lever 9 about shaft 3 causes linkage 11 to be displaced downwardly to the left as shown in the figure. This displacement of linkage 11 causes a concurrent counterclockwise rotation of lever 10 about shaft 13 so that lever 10 no longer engages the lug 14 in the recess 15 of the lock member 16. The locking member for the headlight has now released. As the output shaft of electric motor 18 continues to rotate in the clockwise direction, thereby causing clockwise rotation of member 20 about the output shaft, connecting rod 21 is urged downwardly which, in turn, rotates operating lever 22 in a clockwise direction about the axis of the shaft 3 so that the shaft 3 itself rotates in a clockwise direction about its axis. Since the shaft 3 is fixed to the base of the headlight, the base 4 of the headlight rotates in a clockwise direction about the axis of the shaft 3 as the lever 20 continues to rotate about the output shaft of the motor. Eventually, the member 20 has rotated 180° about its position shown in the bold lines in FIG. 1 so that the headlight will have been retracted from its in-use position B to its retracted or out-of-use position A and will come to rest against a stop member 25 in the headlight compartment of the body of the vehicle and the motor 18 is deenergized.

In order to raise the headlight from its rest or out-of-use position A within the body of the vehicle to its in-use or upright position B, the motor 18 is again energized causing clockwise rotation of the member 20 from the position shown by the broken lines 6 in FIG. 1. As member 20 rotates in the clockwise direction back towards its original position shown by the bold lines, connecting rod 20 causes counterclockwise rotation of operating lever 22 and, consequently, counterclockwise rotation of shaft 3 about its axis to cause the headlight assembly itself to be rotated in a counterclockwise direction about the axis of shaft 3. Eventually, rotation of the member 20 to its position shown the bold lines in FIG. 1 causes the headlight to be in its upright or in-use position. As the headlight approaches its in-use fully upright position B, lever 10 is operated by the lock member 16 to cause rotation of lever 10 and concurrent rotation of lever 19 so that, once in the upright position, lever 19 will rest against pin 23 and lever 10 will engage the recess 15 of lock member 16. With the headlight now again in its upright position as shown in the bold lines in FIG. 1, the locking mechanism holds the headlight in this position in the manner described previously. Motor 18 is deenergized.

Albeit the foregoing description relates to the pivoting mechanism for a single headlight, shaft 3 may be extended in such a manner that a second headlight can be rotated by the same shaft. A further holding mechanism will be associated with the second headlight and can be operated by a Bowden cable.

While I have shown and described a single embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. In a retractable headlight arrangement for a motor vehicle in which a headlight is mounted on a shaft for rotation by a driving device about an axis between first and second stabilized positions, said arrangement having a locking mechanism for fixing said headlight in one of said stabilized positions, the improvement wherein said driving device comprises
    rotatably driven crank means, mechanically coupled to said shaft, for causing rotation of said shaft and consequent displacement of said headlight between said first and second stabilized positions; and
    locking engagement means, coupled between said rotatably driven crank means and said locking mechanism, for operating said locking mechanism during rotation of said rotatably driven crank means; and
    wherein the mechanical coupling between said rotatably driven crank means and said locking mechanism is such that said rotatably driven crank means causes, during its rotation, operation of said locking engagement means without displacement of said headlight.

2. The improvement according to claim 1, wherein said locking engagement means comprises a first double-armed lever, rotatably mounted about an axis and operatively coupled to said rotatably driven crank means, a second double-armed lever rotatably mounted about an axis and operatively coupled to a locking member, and linkage means for connecting said first and second double-armed levers to each other, and causing concurrent operation thereof.

3. The improvement according to claim 2, wherein said first double-armed lever is rotatably mounted on said shaft.

4. The improvement according to claim 3, wherein said driving device includes a rotatable drive shaft, said rotatably driven crank means includes a rotatable gear crank member affixed to said drive shaft, and said first double-armed lever is operatively engageable with said rotatable gear crank member.

5. The improvement according to claim 4, wherein said rotatably driven crank means further includes a pin affixed to said rotatable gear crank member which first double-armed lever engages to operate said locking mechanism.

6. The improvement according to claim 2, wherein said locking member has the configuration of a lock handle having a surface abutting said second double-armed lever for operating said second lever.

7. The improvement according to claim 1, further including a biasing spring for urging said locking engagement means in a direction to cause said locking mechanism to retain said headlight in a stabilized position.

8. The improvement according to claim 5, wherein said locking member has the configuration of a lock handle having a surface abutting said second double-armed lever for operating said second lever.

9. The improvement according to claim 8, further including a biasing spring for urging said locking engagement means in a direction to cause said locking mechanism to retain said headlight in a stabilized position.

10. The improvement according to claim 4, wherein said rotatably driven crank means further includes a connecting rod mechanism coupling said shaft to said rotatable gear crank member.

11. In a retractable headlight arrangement for a motor in which a headlight is mounted on a shaft for rotation by a driving device about an axis between first and second stabilized positions, said arrangement having a locking mechanism for fixing said headlight in one of said stabilized positions, the improvement wherein said driving device comprises:

retractable crank means for causing rotation of said shaft and consequent displacement of said headlight between said first and second positions;

driving means for rotating said crank means about an axis; and mechanical coupling means operatively associating said crank means with said shaft and with said locking mechanism, said mechanical coupling being so configured that with said headlight in said one position, as said crank means is rotated by said driving means, said crank means will cause said locking mechanism to become disengaged without a resultant displacement of said headlight and during subsequent movement will cause rotation of said shaft to displace said headlight.

* * * * *